(12) United States Patent
Behrens et al.

(10) Patent No.: US 8,011,556 B2
(45) Date of Patent: Sep. 6, 2011

(54) DEVICE FOR THE CONNECTING OF STRIPS

(75) Inventors: Holger Behrens, Erkrath (DE); Robert Berg, Langenfeld (DE); Lutz Küemmel, Jüechen (DE); Manuel Bendler, Düesseldorf (DE); Ralf-Hartmut Sohl, Solingen (DE); Peter De Kock, Oberhausen (DE); Michael Tomzig, Hattersheim (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 0 days.

(21) Appl. No.: 12/734,892

(22) PCT Filed: Dec. 3, 2008

(86) PCT No.: PCT/EP2008/010213
§ 371 (c)(1),
(2), (4) Date: Oct. 1, 2010

(87) PCT Pub. No.: WO2009/071268
PCT Pub. Date: Jun. 11, 2009

(65) Prior Publication Data
US 2011/0036901 A1   Feb. 17, 2011

(30) Foreign Application Priority Data

Dec. 5, 2007  (DE) .................. 10 2007 058 840
May 6, 2008   (DE) .................. 10 2008 022 269

(51) Int. Cl.
*B23K 37/00*  (2006.01)
*B23K 37/04*  (2006.01)
*B23K 31/02*  (2006.01)

(52) U.S. Cl. ........ 228/4.1; 228/5.7; 228/44.3; 228/49.4; 228/170; 228/212

(58) Field of Classification Search ................... 219/101, 219/57
See application file for complete search history.

(56) References Cited

U.S. PATENT DOCUMENTS

| 3,256,419 | A | * | 6/1966  | Taylor et al. ...................... 219/83 |
| 3,394,857 | A | * | 7/1968  | Wheeler et al. ................ 228/5.7 |
| 3,403,833 | A | * | 10/1968 | Wheeler et al. ................ 228/5.7 |
| 3,585,344 | A | * | 6/1971  | Heymann et al. .............. 219/72 |
| 3,593,907 | A |   | 7/1971  | Hahne |
| 3,647,131 | A | * | 3/1972  | Hahne ........................... 228/5.1 |
| 3,816,696 | A | * | 6/1974  | Wheeler et al. .......... 219/124.21 |
| 4,063,061 | A |   | 12/1977 | Yoshiharu |
| 4,626,651 | A | * | 12/1986 | Taniguchi et al. ....... 219/121.63 |
| 4,721,241 | A | * | 1/1988  | Yuasa et al. .................... 228/5.7 |
| 4,765,532 | A | * | 8/1988  | Uomoti et al. ................ 228/212 |
| 5,125,554 | A | * | 6/1992  | Geiermann et al. .......... 228/5.7 |

(Continued)

FOREIGN PATENT DOCUMENTS

DE       38 09 713 C    4/1989

(Continued)

*Primary Examiner* — Kiley Stoner
*Assistant Examiner* — Carlos Gamino
(74) *Attorney, Agent, or Firm* — Abelman, Frayne & Schwab

(57) ABSTRACT

The invention relates to a device (100) for the connecting of strips to an endless strip with a clamping arrangement (110, 120) with a clamping device (110-r, 120-r) on the inlet side and a clamping device (110-l, 120-l) on the outlet side, a cutting arrangement (155) with an upper cutter (150) and a lower cutter (130) and with a joining arrangement, in which at least the clamping device (110-r, 120-r) on the inlet side and/or the clamping device (110-l, 120-l) on the outlet side is constructed as a premountable unit.

13 Claims, 8 Drawing Sheets

U.S. PATENT DOCUMENTS

| | | | | |
|---|---|---|---|---|
| 5,234,154 A | * | 8/1993 | Kajiwara et al. | 228/158 |
| 5,536,915 A | * | 7/1996 | Peru et al. | 219/121.63 |
| 5,720,425 A | * | 2/1998 | Tazoe et al. | 228/171 |
| 6,010,055 A | * | 1/2000 | Tazoe et al. | 228/5.7 |
| 6,070,781 A | * | 6/2000 | Johnson et al. | 228/49.4 |
| 6,373,027 B1 | * | 4/2002 | Jeong | 219/158 |
| 6,572,003 B2 | * | 6/2003 | Miyata et al. | 228/49.1 |
| 6,612,477 B2 | * | 9/2003 | Takeda et al. | 228/5.7 |
| 6,860,174 B2 | | 3/2005 | Kusama | |
| 7,735,706 B2 | * | 6/2010 | Sohl et al. | 228/4.1 |
| 7,748,595 B2 | * | 7/2010 | Jin | 228/44.3 |
| 2009/0084828 A1 | | 4/2009 | Sohl | |

FOREIGN PATENT DOCUMENTS

| | | | |
|---|---|---|---|
| DE | 102005034221 A | * | 1/2007 |
| DE | 102006056481 A | * | 10/2007 |
| JP | 59001085 A | * | 1/1984 |
| JP | 01284481 A | * | 11/1989 |

* cited by examiner

DEVICE FOR THE CONNECTING OF STRIPS

TECHNICAL FIELD

The invention relates to a device and a method for the connecting of strips in particular to an endless strip.

PRIOR ART

In the processing of metal strips, it is expedient if this processing takes place continuously, because thereby no changeover times have to be expended in the process for the changeover of the workpieces which are to be processed. When, however, the workpieces are present as strips of limited length, it is advantageous to connect these advantageously, in which through multiple repetition of such a connection, a so-called "endless strip" can thus be produced, which can then be processed in a continuous processing line (conti-line). After processing as an endless strip, the endless strip is typically divided again into individual strips.

Such devices have become known for example through WO 2007/124872 A1. Here, the upper and lower cutters are guided swivellably through articulation connections.

DEMONSTRATION OF THE INVENTION, PROBLEM, SOLUTION, ADVANTAGES

It is therefore an object of the invention to provide a device and a method by means of which an endless strip of sheet metal strips can be produced simply and with a high quality.

This is achieved with regard to the device in accordance with the invention by a device for the connecting of strips to an endless strip with a clamping arrangement with a clamping device on the inlet side and a clamping device on the outlet side, a cutting arrangement with an upper cutter and a lower cutter and with a joining arrangement, in which at least the clamping device on the inlet side and/or the clamping device on the outlet side is constructed as a pre-mountable unit. This causes the elements belonging to the actuation of the clamping device being able to be premounted jointly and being able to be installed with each other into the frame of the device. This has the advantage that an exchange can be carried out relatively quickly and the production process thereby does not have to be interrupted for a very long period of time. Furthermore, the pre-mountable unit allows an accurate positioning of the unit, so that its adjustment can already be carried out before mounting.

The object of the invention is also achieved by a device for the connecting of strips to an endless strip with a clamping arrangement with a clamping device on the inlet side and with a clamping device on the outlet side, a cutting arrangement with an upper cutter and a lower cutter and with a joining arrangement, in which the strips for joining are able to be raised into a welding position by means of the clamping device on the inlet side and on the outlet side via the lower cutters. This is advantageous in particular when the lower cutters are stationary, because thereby the joining process can be carried out without the cutters of the cutting device being impaired.

It is advantageous in particular if the cutting arrangement is equipped with a lower cutter and upper cutter, the lower cutter being fixed in a frame of the device and the upper cutter being displaceable at least vertically in a controlled manner. It is thereby achieved that the position of the lower cutter is fixed and is not affected with regard to tolerance by a swivel mechanism.

Furthermore, it is advantageous if the cutting arrangement comprises upper and lower cutters, in which the upper cutters are movable from above for the cut in the direction of the stationary lower cutters.

It is also expedient if, after the cut, the cut strip ends are movable towards each other by lateral displacement of the corresponding clamping arrangement.

It is particularly advantageous if, after the lateral displacement of the strip, a further second cut is able to be carried out, so that thereby also a more accurate cut is able to be carried out.

Furthermore, it is expedient if, to support the strip ends, at least one welding table is able to be moved under the strip.

It is also expedient if the device is constructed so as to be substantially symmetrical and has two clamping arrangements, two cutting arrangements and at least one joining arrangement.

With regard to the method, this is achieved by a method for operating a device for the connecting of strips to an endless strip with a clamping arrangement with a clamping device on the inlet side and a clamping device on the outlet side, a cutting arrangement with an upper cutter and a lower cutter, and with a joining arrangement, characterized in that in a first step the clamping devices are opened and two strip ends are introduced, and in a subsequent step the strip ends are clamped in the clamping devices, in a next step the strip ends are cut by means of the cutting arrangement and thereafter the cut ends are positioned again, before they are cut again and are thereafter positioned again and are joined.

It is advantageous here if a support at least of one strip end is provided by a welding table.

It is also expedient if a vertical adjustment at least of one strip end takes place, in particular for balancing out differences in thickness of the strip ends.

Advantageous further developments are described in the sub-claims.

BRIEF DESCRIPTION OF THE DRAWINGS

The invention is explained in further detail below on the basis of an example embodiment with the aid of the drawings, in which.

PREFERRED EMBODIMENT OF THE INVENTION

The device according to the invention for the connecting of individual strips is described below with the aid of FIGS. 1 to 8. Here, identical components are respectively designated by the same reference numbers. Typically, the device shown in the respective figures is constructed at least partially symmetrically. Therefore, elements of the device on the right-hand side are designated by -r and on the left-hand side by -l.

Figure 1:
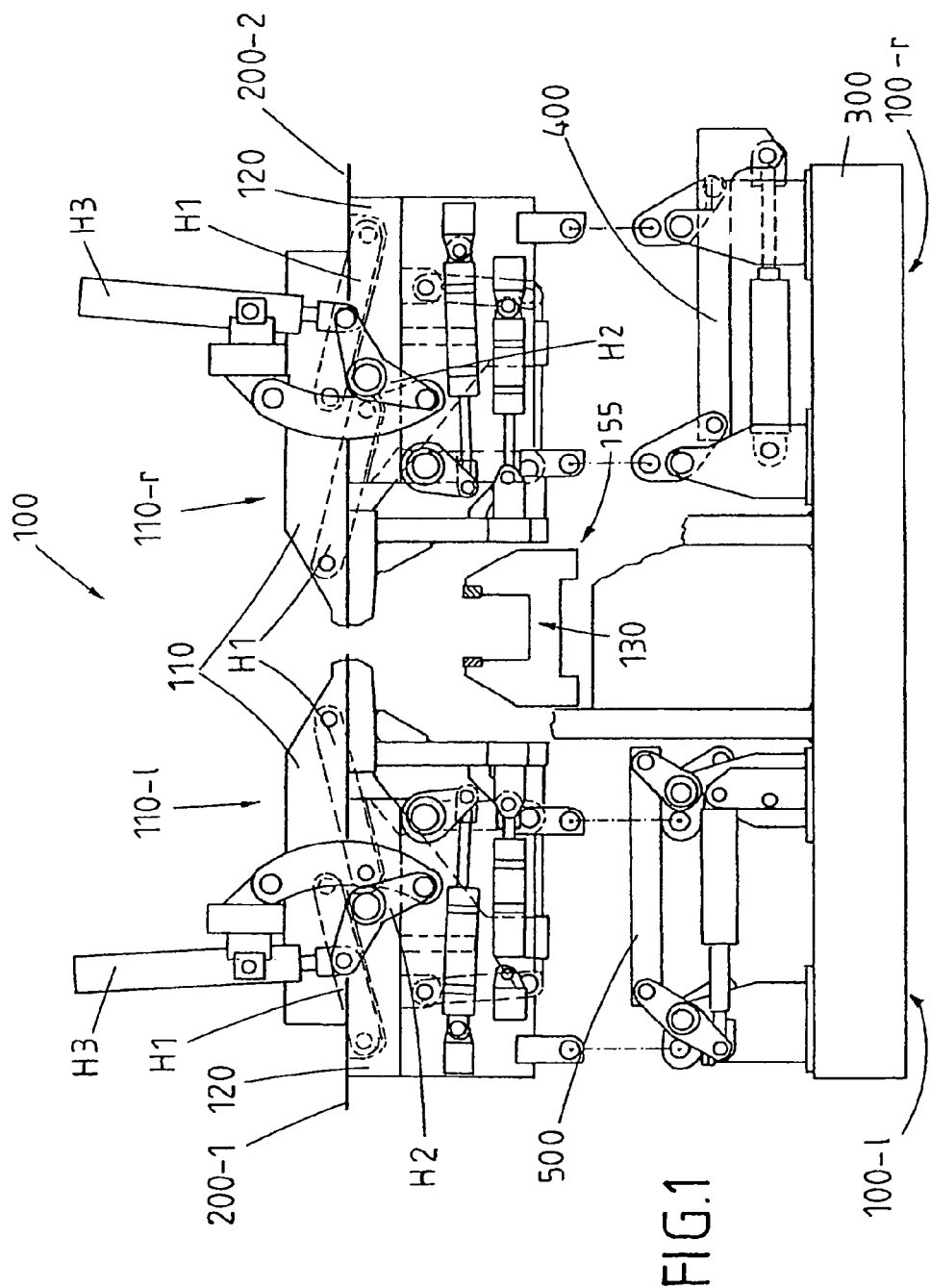
FIG. 1 shows a diagrammatic illustration of a device according to the invention for the joining of strips.

FIG. 1 shows the device according to the invention for the connecting of strips 100, which has a right-hand part 100-r and a left-hand part 100-l of the device 100. The two parts of the device are constructed substantially in mirror symmetry and are basically respectively responsible for the handling of one of the individual strips which are to be connected to each other. Thus, a first individual strip 200-1 is introduced from the left into the left-hand part 100-l and a second individual strip 200-2 is introduced from the right into the right-hand part 100-r of the device 100 or supplied thereto.

For the introducing of the respective strips 2001-1, 200-2, the upper strip clamp 110-l, 110-r can be swivelled respectively upwards into an open position via levers H1 which are arranged in the manner of a parallelogram. For this, the levers H1 are respectively arranged on the lower and on the upper strip clamp 110, 120 via articulations, so that in the case of a swivelling of the levers, the upper strip clamp swivels relative to the lower strip clamp. Here, the device 100 has clamping devices 110, 120 both in the right-hand part 100-r and also in the left-hand part 100-l, which can be opened and closed for gripping and holding the strip or the individual strip 200-1, 200-2. The clamping devices 110, 120 consist here respectively of two strip clamps 110-r, 110-l and 120-r and 120-l which are displaceable or swivellable relative to each other. Here, the respectively upper strip clamp 110-r or 110-l is in cooperation with the lower strip clamp 120-r or 120-l. The upper strip clamp 120 can be swivelled by the guide of the parallelogram-like levers H1 such that between the upper strip clamp 110 and the lower strip clamp 120 a gap or receiving zone is produced to receive the strip 200-1, 200-2, which is closed again by the swivelling back, and the strip is clamped and held by the strip clamps 110, 120. Here, at least the upper and the lower strip clamps 110, 120 form a clamping arrangement for clamping a strip. The strip clamps 110, 120 are constructed so as to be swivellable by means of the levers H1, in which respectively two levers engage on the upper and the lower strip clamp and in which a hydraulic cylinder H3 controls via a lever H2 the moving apart or moving together of the strip clamps 110, 120, see also FIG. 2. Here, the hydraulic cylinder H3 is actuated systematically by means of a control arrangement which is not described in further detail. Instead of the hydraulic cylinder, basically also a different cylinder which is actuated by pressure medium, or else an electromechanical servo motor can be used.

The clamping device 110, 120 is advantageously constructed with the levers H1, H2 and adjustment elements H3 such as hydraulic cylinders, as a pre-mounted unit, which can be mounted jointly and also dismantled again in the case of repair or maintenance.

Figure 3:
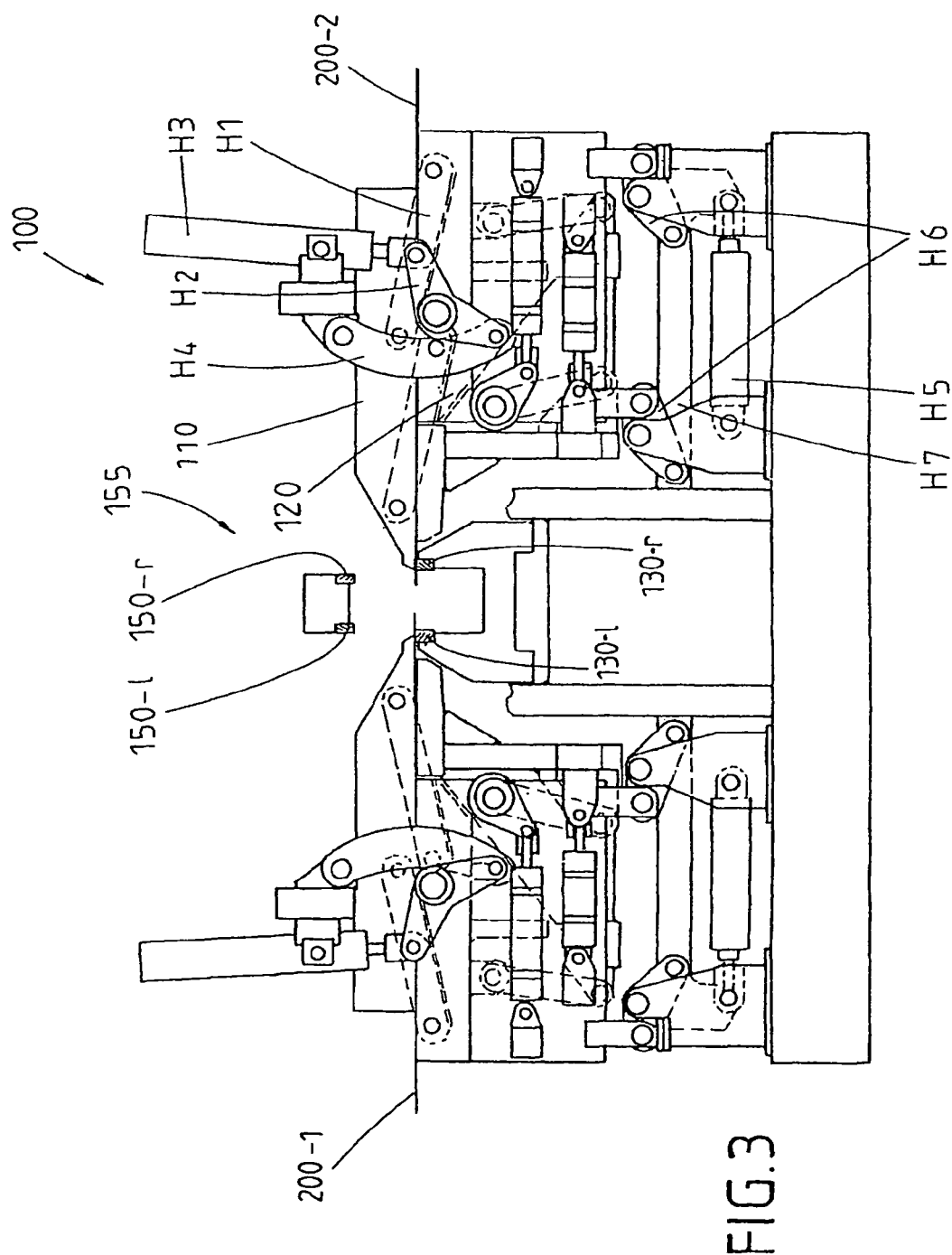
FIG. 3 shows a diagrammatic illustration of a device according to the invention for the joining of strips.

Furthermore, in FIG. 1 alongside the right-hand and left-hand clamping device 110-r, 120-r, 110-l, 120-l, a lower cutter magazine 130 of a cutting device 155 can be seen, which is able to be securely connected with a frame 300 of the device 100. Here, the lower cutter magazine 130 is advantageously fixed and immovable, but is nevertheless able to be connected detachably with the frame 300, so that if necessary it can be dismantled and exchanged with the lower cutter for purposes of maintenance and/or repair or for the purpose of a change of cutter. Here, after detaching at least a connection between lower cutter magazine 130 and the frame 300, the magazine 130 can be withdrawn from the frame 300. The cutting device 155 is constructed here such that the upper cutter or the upper cutter magazine 150, see FIG. 3, is moved or displaced or acted upon for cutting onto the lower cutter or towards the lower cutter magazine.

Furthermore, it can be seen in FIG. 1 that the clamping devices 110, 120 are adjustable in their height and also in their lateral position by means of the lifting and positioning arrangements 400. Through the hydraulic cylinders, levers and synchronization rods forming the positioning arrangement 400, the clamping device can be respectively positioned.

Furthermore, a so-called retraction arrangement 500 can be seen in FIG. 1, which serves to move the clamping device 110, 120 in lateral direction. Through the hydraulic cylinders, levers and synchronization rods forming the retraction arrangement 500, the respective clamping device or at least one or else both thereof can be positioned respectively in lateral direction. Thereby, the clamping device can be displaced after the cut at least from one side, in order to cut the cut strip again at the cutting site or at least slightly adjacent thereto.

Figure 2:
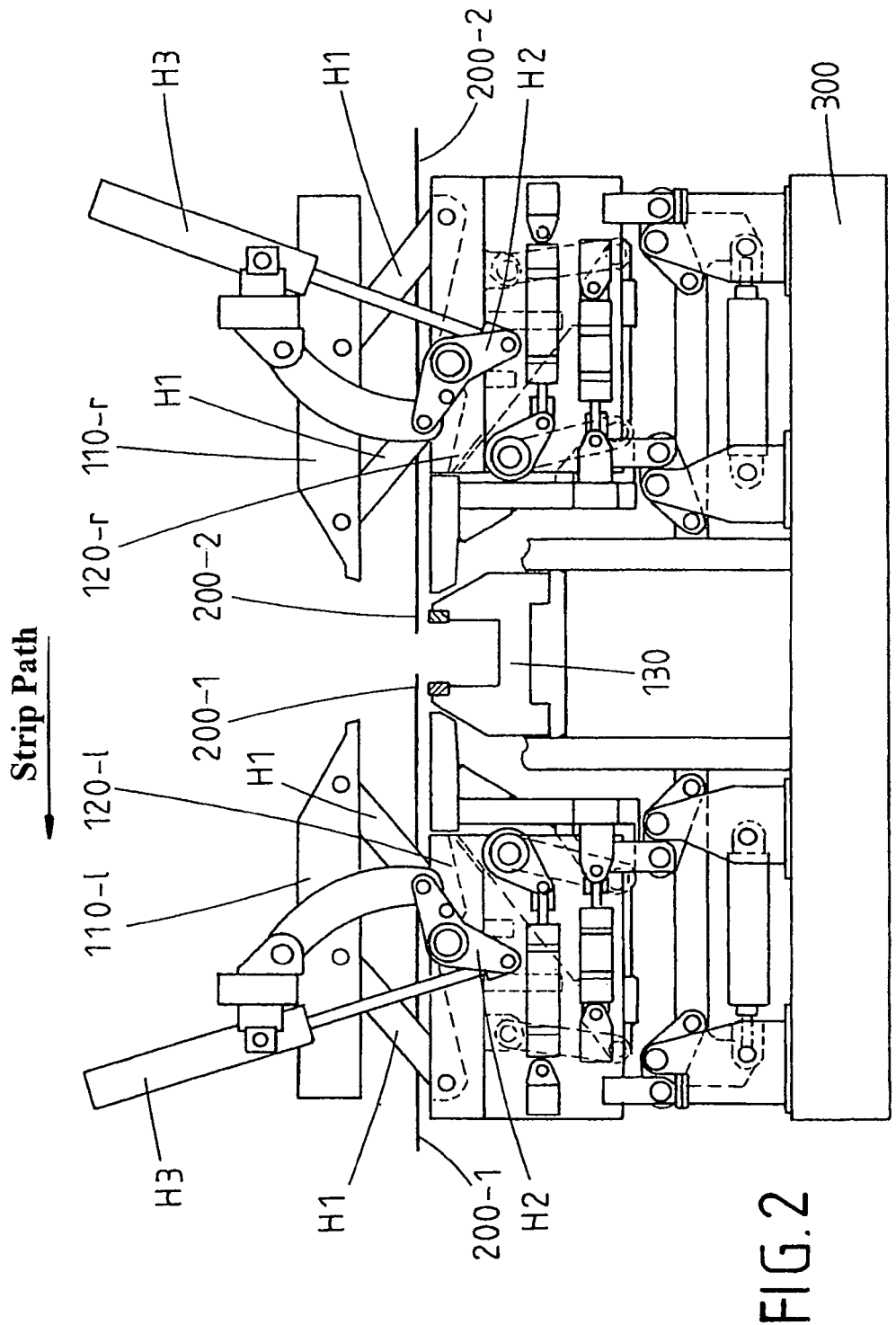
FIG. 2 shows a diagrammatic illustration of a device according to the invention for the joining of strips.

FIG. 2 shows how a strip 200-1, 200-2 is introduced respectively into an opened clamping arrangement 110, 120. Here, the upper strip clamp 110 forms a clamping bar and the lower strip clamp 120 forms a clamping table, between which the strip can be clamped. For cutting the two strips, the two individual strips 200-1 and 200-2, after the opening of the strip clamps 110, 120, are initially pushed together coming from the right and coming from the left in the direction of the centre of the device 100 so that, however, they do not imperatively touch each other or lie "edge to edge" in the region between the strip clamps. However, it is essential that the respective strip 200-1, 200-2 is pushed in so far that the respectively front end of the strip lies over the respective cutter of the lower cutter magazine 130. The upper strip clamps 110-r and 110-l are then lowered into a lower closing position for clamping again, in which the two individual strips 100-1 and 200-2 are then securely clamped between the upper strip clamp 110-r, 110-l and a lower strip clamp 120-r and 120-l.

The upper strip clamps 110-r and 110-l are guided via the lever arms H1 in their swivelling movement and the driving force for the swivelling process is applied for example by hydraulic cylinder H3. The opening and the closing of the upper strip clamps 110 is brought about here by means of hydraulic cylinder H3-l and H3-r in cooperation with the tongues H2 and the levers H1.

FIG. 3 shows that the strips 200-1, 200-2 then rest in the central region simultaneously on the lower cutters 130-l, 130-r. In the central region between the left-hand and the right-hand upper strip clamp 110-l, 110-r, upper cutters 150-l, 150-r then drop onto the two strips and in cooperation with the lower cutters 130-l, 130-r cut off their respective ends. After the cutting, the two new ends of the strips 200-1, 200-2 respectively have a clean and straight cut edge, the two cut edges then being aligned substantially parallel to each other. Here, at least the upper and the lower cutters 130, 150 form a cutting arrangement 155 for cutting a strip.

FIG. 3 shows, furthermore, the device 100 in the operating state of clamping and cutting. By means of the cylinders H3, the strips 200-1, 200-2 are gripped via the levers H2 and the upper connecting pieces H4 between the lower clamping table 120 and the upper clamping bar 110.

Furthermore, the respective strip end is tightened in the clamping device with the strip clamps 110, 120 against the lower cutters 130. For this, the strip ends of the strips 200-1, 200-2 which are gripped in the clamping device, are acted upon by means of the cylinders H5 via the levers H6 and the synchronization rods H7 against the lower cutters of the lower cutter magazine. The strip ends of the strips 200-1, 200-2 can then be cut.

Figure 4:
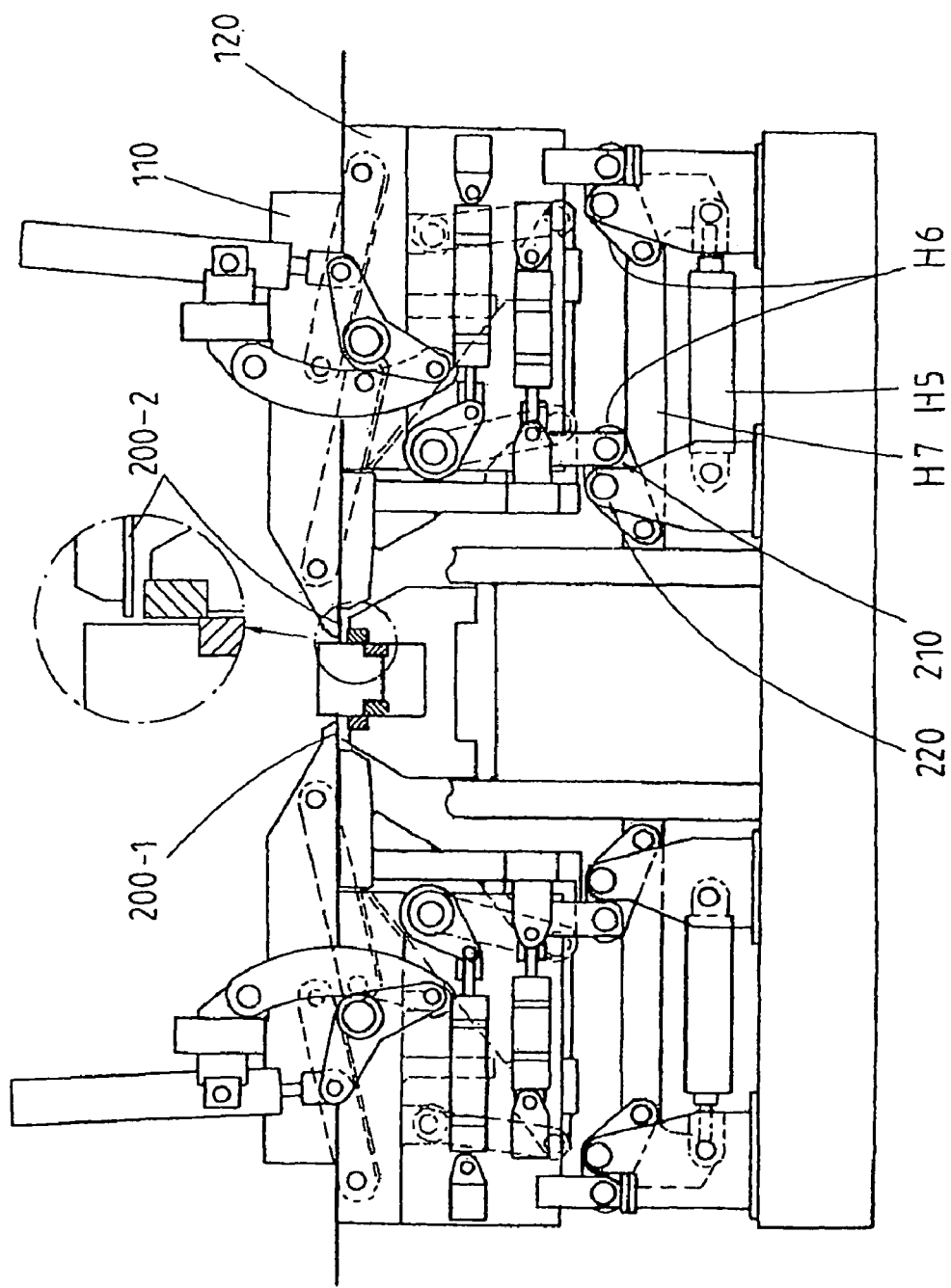
FIG. 4 shows a diagrammatic illustration of a device according to the invention for the joining of strips.
Figure 5:
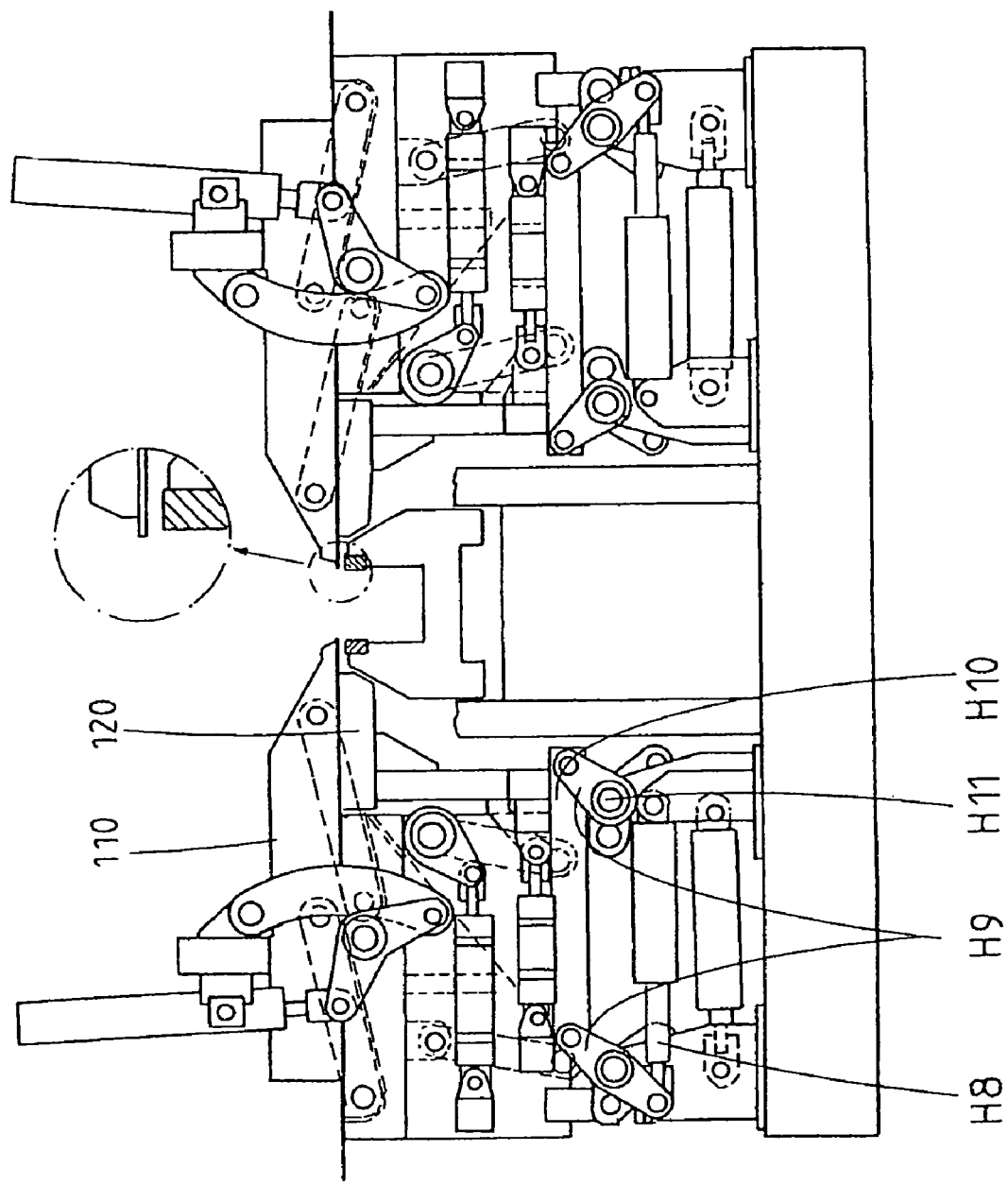
FIG. 5 shows a diagrammatic illustration of a device according to the invention for the joining of strips.

FIG. 4 shows that on cutting, the rotation points 210 lie under the rotation points 220. Through an advantageously position-controlled extending of the cylinder H5, the rotation points 210 and 220 can be brought to the same horizontal height. Thereby, the clamping devices 110, 120 are respectively raised at least slightly and moved apart, so that the strip ends of the strips move away from the cutter with the respectively cut start of the strip. It is thereby permitted that the upper cutters can be moved, such as for example moved in, without touching the cut strip ends, because the latter have been moved at least slightly away from the upper cutter.

After the upper cutter has been moved away upwards, a second cut can take place. To repeat the cut, it can be seen in FIG. 5 that the clamping device 110, 120 can be moved in inwards by means of the cylinders H8, the levers H9, the synchronization rods H10 and the eccentrics H11 in the direction of the cutters. For this, the cylinder H8 is actuated such that its push rod moves towards the left, so that the lever H9 rotates clockwise and hence the synchronization rod H10 moves towards the right and displaces the clamps of the clamping device 110, 120 inwards.

Figure 6:
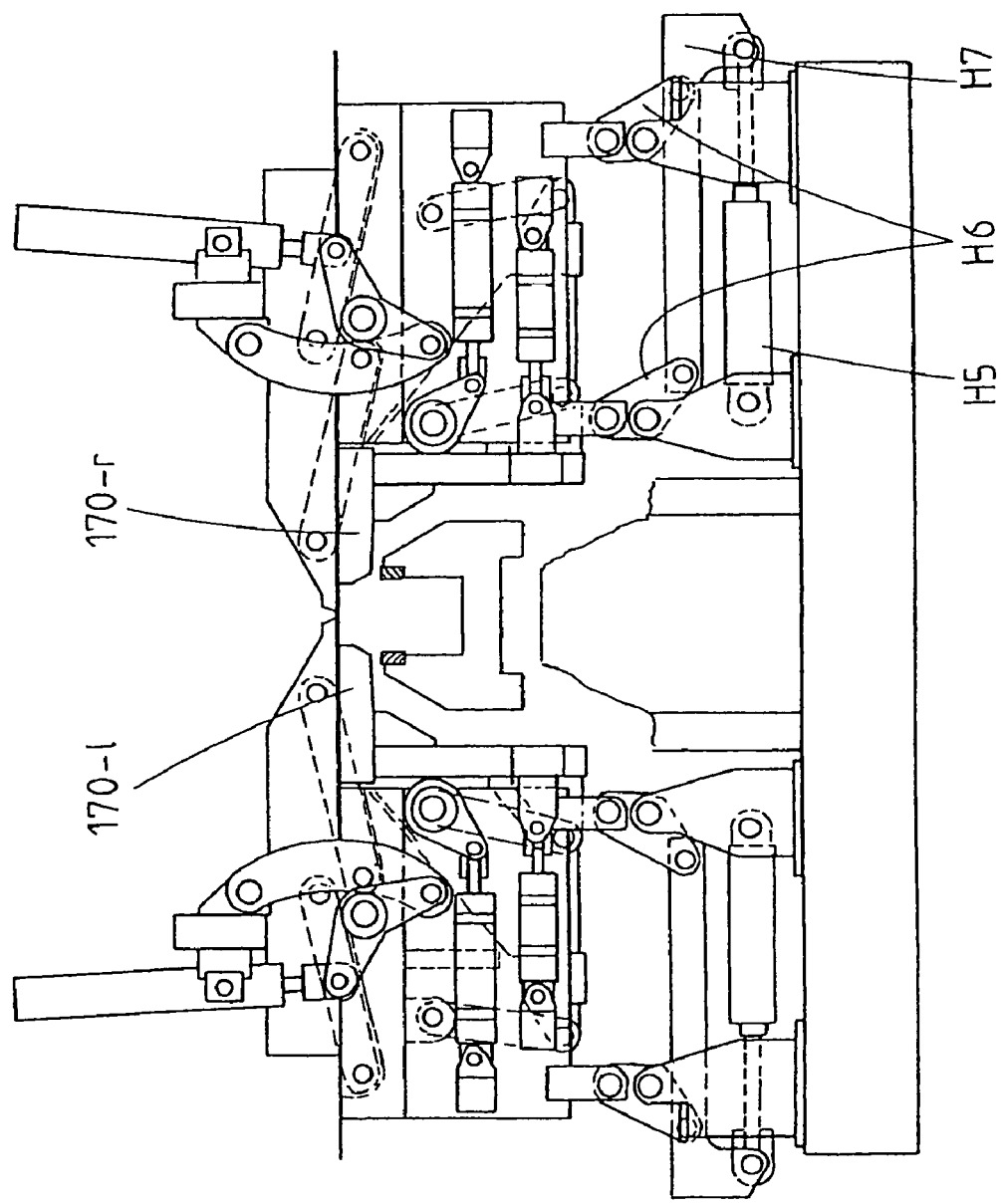
FIG. 6 shows a diagrammatic illustration of a device according to the invention for the joining of strips.

FIG. 6 shows how the strip ends are swivelled into the position necessary for welding, after the cut of the strip ends. For this, through a position-controlled extending of the hydraulic cylinders H5, the clamping devices 110, 120 are moved into the welding position by means of the rocker arms H6 and the synchronization rods H7, so that the two strip ends at least almost touch each other. There is still a slight gap between the two strip ends, i.e. strip end and start of strip. The welding tables 170-*l*, 170-*r* are not yet in the welding position in FIG. 6. It is also advantageous if the welding tables 170 are constructed in one or several parts. Also, they can be designed so as to be movable or swivellable by means of actuating elements, such as by means of hydraulic cylinders and/or levers for example.

Figure 7:
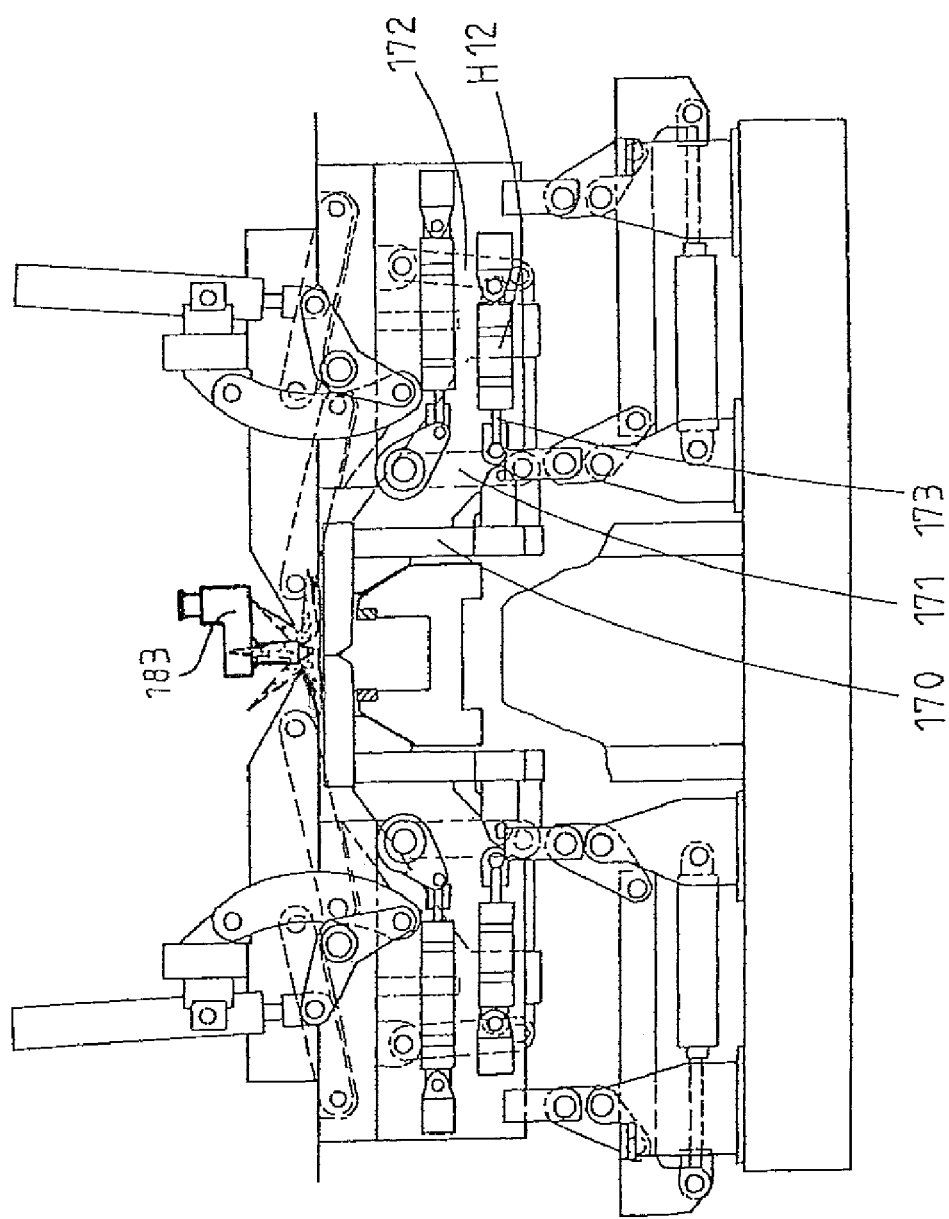
FIG. 7 shows a diagrammatic illustration of a device according to the invention for the joining of strips.

To support the strip ends of the strips 200-1, 200-2 at the joining site which is to be welded, a left-hand and a right-hand welding table 170-*l*, 170-*r* is then moved laterally from below against the strip ends, in accordance with FIG. 7.

Here, the welding tables 170 are displaced into the welding position by means of the rocker arms 171, 172 and of the cylinder H12. The welding table is suspended in the manner of a parallelogram by means of the rocker arms 171, 172, and can be swivelled by the cylinder H12, arranged on one side on a fixed bearing, by means of the push rod 173 of the cylinder H12, and thereby displaced laterally.

Figure 8:
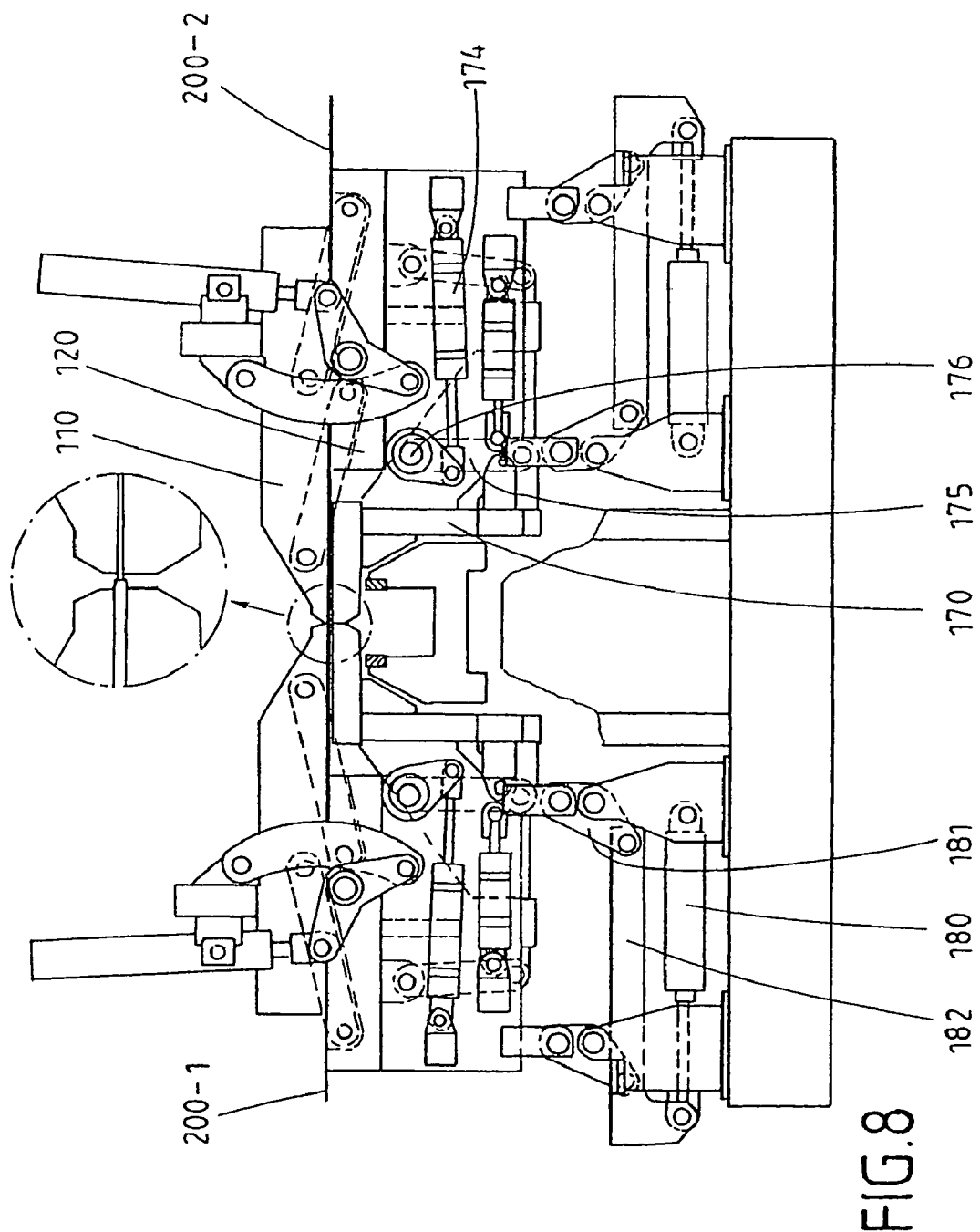
FIG. 8 shows a diagrammatic illustration of a device according to the invention for the joining of strips.

FIG. 8 shows that the welding tables 170 are now displaced to the centre. Here, the welding tables 170 grip the strip 200-1, 200-2 in the region of the welding tables 170 against the upper clamping bars 110 of the clamping device 110, 120. Here, the hydraulic cylinder 174 is actuated and the welding table 170 is acted upon upwards via the rocker arm 175 and the eccentric 176.

Thereby, even in the case of differing strip thicknesses on the left-hand and on the right-hand side, the strip can be adjusted centrally or symmetrically to each other. Here, a great accuracy can be achieved with strips of equal thickness, when the cylinders 174 move to the end positions or against stops.

Thereby, before the welding of the strip ends, in particular in the case of strips of differing thickness, a height equalization is produced, so that the two strip ends can be positioned centrically to each other vertically, and fixed; in other words, the strips are joined on neutral axis. The thus adjusted position of the strip ends to each other represents the actual welding position.

Furthermore, it can be seen in FIG. 8 that the weld gap is able to be adjusted by means of the cylinder 180 and via the levers 181 and the synchronization rods 182. Here, the gap is adjusted between the clamping bars 110. Here, the cylinder 180 can be moved in a position-controlled manner, whereby a presettable gap is produced, or moving takes place in a force-controlled manner against a stop, whereby the strips are also moved together under pressure in the weld gap.

In the welding position, the strip ends are then joined by means of a joining arrangement (183), which is able to be lowered for example from above over the welding position and welds the strip ends with each other.

LIST OF REFERENCE NUMBERS 100 device
100-*r*, 100-*l* right-hand or left-hand part of the device
110 upper strip clamp
110-*l*, 110-*r* upper strip clamp left or right, clamping bar
120 lower clamping bar
120-*l*, 120-*r* lower strip clamp left or right, clamping table
125 clamping arrangement
130 lower cutter, lower cutter magazine
130-*l*, 130-*r* lower cutter
150 upper cutter, upper cutter magazine
150-*l*, 150-*r* upper cutter
155 cutting device
160 hydraulic cylinder
160-*l*, 160-*r* hydraulic cylinder
170 welding table
170-*l*, 170-*r* welding table
171 rocker arm
172 rocker arm
173 push rod
174 hydraulic cylinder
175 rocker arm
176 eccentric
180 cylinder
181 lever
182 synchronization rod
200 strip
200-1 individual strip
200-1.1 individual strip
210 rotation point
220 rotation point
300 frame
400 positioning arrangement
500 retraction arrangement
H1 lever
H2 tongue, lever
H3 hydraulic cylinder, cylinder
H4 connecting piece
H5 cylinder
H6 lever, rocker arm
H7 synchronization rod
H8 cylinder
H9 lever
H10 synchronization rod
H11 eccentric
H12 cylinder

The invention claimed is:

1. A device (100) for connecting separate strips in an endless strip, comprising:
 a first clamping device provided on an inlet side of the connecting device for clamping one separate strip and a second clamping device provided on an outlet side of the connecting device for clamping another separate strip, the first clamping device and the second clamping device each having an upper clamp (110-*r*, 110-*l*), a lower clamp (120-*r*, 120-*l*), and means (H1, H2, H3) for displacing the upper clamp (110-*r*, 110-*l*) and the lower clamp (120-*r*, 120-*l*) between an open position in which a strip can be freely displaced therebetween, and a closed position in which the strip is clamped therebetween, and the first clamping device and the second clamping device each being formed as a separate unit releasably mountable into the connecting device;

cutting means (155) located between the first clamping device and the second clamping device for cutting ends of the one strip and the another strip; and joining means (183) for connecting the one strip and the another strip with each other;

a frame (340);

a first lifting and positioning device (400) and;

a second lifting and positioning device (500), both supported on the frame for supporting the first clamping device and the second clamping device and for adjusting their respective height and lateral positions.

2. The device according to claim 1, wherein the cutting means (155) has upper cutting means (150) and lower cutting means (130).

3. The claim according to claim 2, wherein the lower cutting means (130) is releasably secured in a frame (300) of the connecting device, and the upper cutting means (150) is displaceable in a controlled manner at least vertically.

4. The device according to claim 1, comprising means (H8, H9, H10, H11) for laterally displacing of the first clamping device and the second clamping device toward each other, whereby the cut ends of the one strip and the another strip move toward each other.

5. The device according to claim 1, comprising at least one welding table (170) movable under the strip.

6. The device according to claim 5, wherein the cutting means (155) comprises two cutting devices (130-*r*, 150-*r*; 130-*l*, 150-*l*); and wherein the first and second clamping devices and the two cutting devices are arranged substantially symmetrically with respect to each other.

7. The device according to claim 1, further comprising means (170-*r*, 170-*l*) for brining the cut ends of the one strip and the another strip in contact with each other.

8. The device according to claim 1, wherein the displacing means comprises a lever arrangement (H1, H2).

9. The device according to claim 7, wherein the bringing means comprises a first table (170-*r*) and a second table (170-*l*) displaceable in a position in which the one strip and the another strip contact each other, the first table (170-*r*) and the second table (170-*l*) forming part of the first clamping device and the second clamping device, respectively.

10. The device according to claim 9, wherein the first clamping device and the second clamping device each comprises means for displacing the tables into a position in which the one strip and the another strip contact each other.

11. The device according to claim 10, wherein the table displacing means comprises two rocker-arms (171, 172) and a fluid cylinder (H12) for displacing the rocker arms.

12. The device according to claim 8, wherein the first clamping device and the second clamping device each comprises a fluid cylinder for displacing the lever arrangement between the open and closed positions of the upper clamp (110-*r*, 110*l*) and lower clamp (120-*r*, 120-*l*).

13. The device according to claim 1, wherein the first and second clamping devices are releasably secured to the first and second lifting and positioning devices.

\* \* \* \* \*